(12) United States Patent
Aftanas (10) Patent No.: US 7,806,306 B2
(45) Date of Patent: Oct. 5, 2010

(54) VEHICLE ARTICLE CARRIER HAVING SINGLE SIDE RELEASE MECHANISM

(75) Inventor: Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 679 days.

(21) Appl. No.: 11/746,845

(22) Filed: May 10, 2007

(65) Prior Publication Data

US 2008/0277437 A1    Nov. 13, 2008

(51) Int. Cl.
B60R 9/00 (2006.01)
B60R 9/045 (2006.01)
B61D 45/00 (2006.01)

(52) U.S. Cl. ............ 224/321; 224/315; 224/320; 224/325; 224/326; 410/104; 410/105

(58) Field of Classification Search ........... 224/311, 224/321, 323, 315, 326, 331, 309, 320, 322, 224/325, 329; 410/104, 105, 143, 150
See application file for complete search history.

(56) References Cited

U.S. PATENT DOCUMENTS

| | | | |
|---|---|---|---|
| 5,715,980 A | 2/1998 | Blankenburg et al. | |
| 5,752,637 A | 5/1998 | Blankenburg | |
| 5,833,103 A | 11/1998 | Rak | |
| 5,924,614 A * | 7/1999 | Kuntze et al. | 224/321 |
| 6,068,169 A | 5/2000 | Aftanas | |
| 6,112,964 A | 9/2000 | Cucheran et al. | |
| 6,131,782 A * | 10/2000 | De Silva et al. | 224/321 |
| 6,779,696 B2 | 8/2004 | Aftanas et al. | |
| 7,044,345 B2 | 5/2006 | Aftanas | |
| 7,198,184 B2 * | 4/2007 | Aftanas et al. | 224/309 |
| 7,441,679 B1 * | 10/2008 | Harberts et al. | 224/321 |

* cited by examiner

Primary Examiner—Nathan J Newhouse
Assistant Examiner—Lester L Vanterpool
(74) Attorney, Agent, or Firm—Harness, Dickey & Pierce, P.L.C.

(57) ABSTRACT

A system and method for forming a vehicle article carrier having a single side release crossbar assembly. The crossbar assembly includes a trigger style, horizontally arranged actuating lever that simultaneously locks and unlocks a pair of locking pins at opposite ends of the crossbar assembly from their respective support rails. The support rails are fixedly secured to an outer body surface of a vehicle such that the crossbar assembly is supported above the outer body surface. The single side release feature eliminates the need for the operator to walk back and forth to both sides of the vehicle to unlock and lock the crossbar assembly when the crossbar assembly needs to be repositioned on the support rails.

17 Claims, 9 Drawing Sheets

VEHICLE ARTICLE CARRIER HAVING SINGLE SIDE RELEASE MECHANISM

TECHNICAL FIELD

The present application relates to vehicle article carrier systems, and more particularly to a vehicle article carrier system having a single sided locking mechanism with a trigger style actuating lever.

BACKGROUND

Vehicle article carriers are used in a wide variety of applications with various types of motor vehicles. Typically a vehicle article carrier will be disposed on the roof portion of a vehicle, or possibly in the bed of a pickup truck. In many instances the typical vehicle article carrier will include a pair of crossbars that are each supported at their opposite ends from a corresponding support track or support rail. The support rail is typically fixedly secured to an outer body surface of the vehicle. In many instances one or both of the crossbars may be adjustable; that is, one or both of the crossbars may be moveable along the support rails and locked at a desired position to enhance the utility of the crossbars in supporting various sizes and shapes of articles being carried on the crossbars.

When repositioning either of the crossbars, typically the user must release some form of locking or latching arrangement at each end of the crossbar. This necessitates that the user first perform an unlocking (or unlatching) operation at one side of the vehicle, then walk to the other side of the vehicle and perform the same operation. The crossbar may then be moved along the support rails to the desired position. The user then locks (or latches) one end of the cross bar to its associated support rail and then walks around to the other side of the vehicle to perform the same action at the opposite end of the crossbar. Accordingly, the simple act of repositioning a crossbar can be somewhat cumbersome for the user. If the user uses his/her vehicle article carrier system frequently to transport articles of widely varying sizes and shapes, then the above-described unlocking and locking action must be performed each time the crossbar is repositioned.

SUMMARY

The present disclosure is related to a vehicle article carrier system and method that incorporates a single side release mechanism. The system is adapted to be used above or adjacent an outer body surface of a vehicle to support articles above the outer body surface. In one embodiment the system includes first and second support rails that are secured fixedly to the outer body surface and generally parallel to one another. Each of the support rails also includes at least one hole formed therein.

The system also includes a crossbar assembly having a pair of outer ends. The outer ends are supported by the support rails so that the crossbar assembly sits above the outer body surface, and thus is able to support articles thereon above the outer body surface. The crossbar assembly includes a crossbar component having opposite ends, with first and second end supports coupled to the opposite ends. The first end support includes a first locking pin and is moveable between extended and retracted positions. The second end support includes a second locking pin and is also moveable between extended and retracted positions. When the first and second locking pins are in their extended positions, they are each able to engage a hole in their respective support rail. This enables the cross bar assembly to be fixedly secured at a specific location along the support rails.

The first end support also includes a trigger shaped actuating lever adapted to be engaged with at least one finger. The actuating lever is pivotally moveable within a horizontal plane when the cross bar is secured to the support rails. The actuating lever is adapted to move the first locking pin into its extended position to engage the hole in the first support rail. This secures the first end support stationary relative to the first support rail. The actuating lever is also adapted to move the first locking pin into the retracted position, which withdraws the first locking pin from the hole in the first support rail, and thus enables the first end support to be moved relative to the first support rail.

An elongated element is used for coupling the actuating lever with the locking pin in the second end support so that movement of the actuating lever enables both of the locking pins to be moved simultaneously between retracted and extended positions. Thus, the user is able to release both end supports of the crossbar assembly from engagement with the support rails simultaneously while standing adjacent one end of the cross bar assembly. The crossbar assembly can then be repositioned at a desired position along the support rails, and then locked at the newly desired position from the same side of the crossbar. Thus, there is no need for the user to walk back and forth to both sides of the crossbar assembly to accomplish unlocking, repositioning, and locking of the crossbar assembly.

In one specific embodiment the elongated element comprises a cable that extends through an interior area of the crossbar assembly. At least one biasing element is included in one of the end supports to assist in biasing both of the locking pins into extended positions relative to their respective end supports. In one specific embodiment a pair of biasing elements is used, with one biasing element being disposed in each end support.

In another embodiment each end support includes at least one support foot that is adapted to engage the support rail. In this regard, the support rail may include a channel having dimensions in accordance with the support foot. Optionally, but preferably, the support foot may include at least one rotationally mounted wheel to assist in enabling smooth movement of each end support along its respective support rail.

BRIEF DESCRIPTION OF DRAWINGS

The drawings described herein are for illustration purposes only and are not intended to limit the scope of the present disclosure in any way.

DETAILED DESCRIPTION

Figure 1:
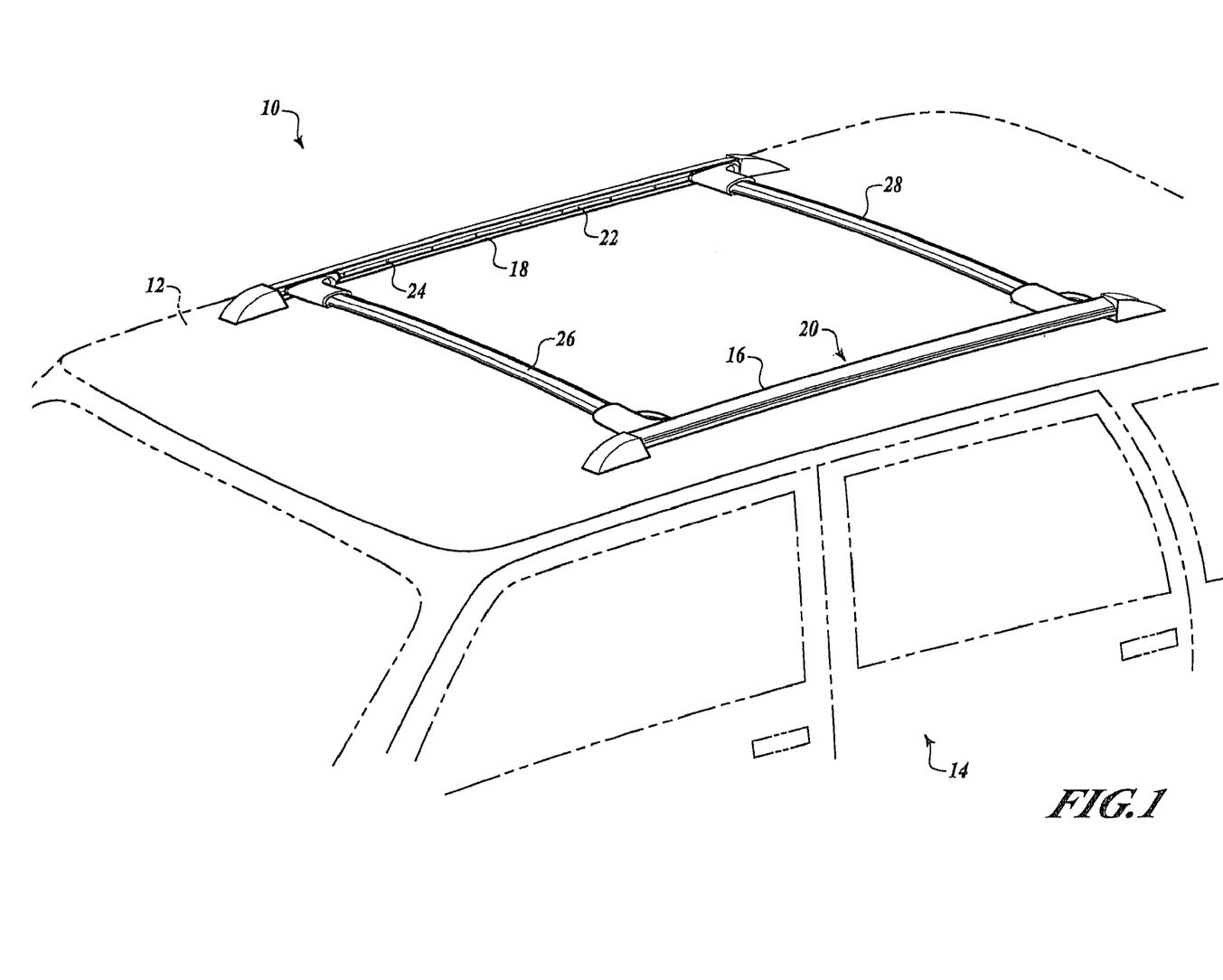
FIG. 1 is a perspective view of one embodiment of a vehicle article carrier apparatus in accordance with the present disclosure.

Referring to FIG. 1, a vehicle article carrier apparatus 10 in accordance with one embodiment of the present disclosure is illustrated supported on an outer body surface 12 of a motor vehicle 14. In this example the motor vehicle 14 is illustrated as a sport utility vehicle (SUV), however it will be appreciated that the apparatus 10 could just as readily be employed on the roof of a van, station wagon or even over the bed of a pick-up truck. The apparatus 10 may be employed in connection with virtually any vehicle where it is desired to transport articles above the generally planar outer surface of the vehicle.

The apparatus 10 includes first and second support rails 16 and 18 that are fixedly secured to the outer body surface 12 of the vehicle 14. The support rails 16 and 18 include channels 20 and 22, respectively. Within the channels 20 and 22 may be formed a plurality of spaced apart holes 24. A first crossbar assembly 26 is supported by the support rails 16 and 18 above the outer body surface 12. Similarly, a second crossbar assembly 28 is also supported by the support rails 16 and 18 above the outer body surface 12. While two crossbar assemblies 26 and 28 have been illustrated, it will be appreciated that a greater number of crossbar assemblies could be employed if needed. Similarly, in this example, crossbar assemblies 26 and 28 are identical in construction, however, one of the crossbar assemblies 26 and 28 could be formed as a fixed component that is non-moveable relative to the support rails 16 and 18. For the purpose of discussion, it will be assumed that crossbar assemblies 26 and 28 are identical in construction, and thus the construction of only crossbar assembly 26 will be described in detail here. Each of the crossbar assemblies 26 and 28 may be secured at the positions defined by the holes 24, and thus may be positioned to support a wide variety or articles of different shapes and sizes thereon.

Figure 2:
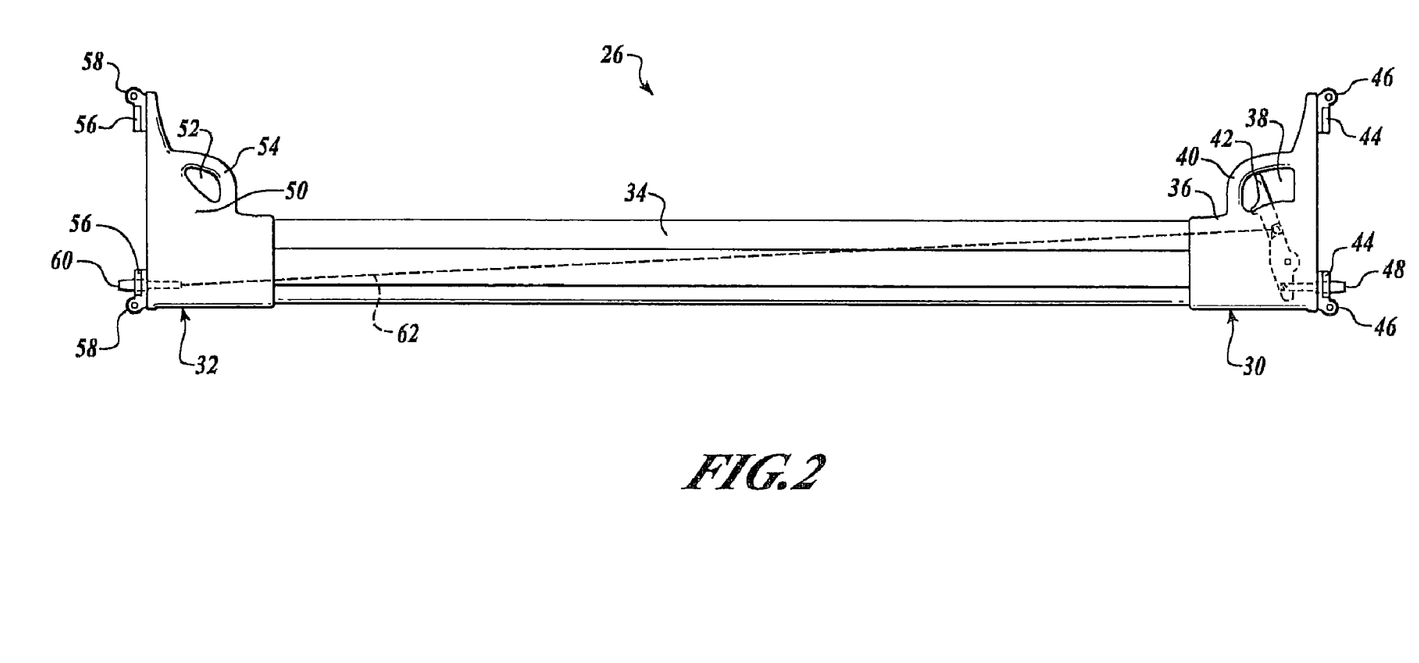
FIG. 2 is a plan view of one of the crossbar assemblies of the vehicle article carrier shown in FIG. 1, with a cable connecting a pair of locking pins at opposite end supports of the assembly shown in dashed lines.

Referring to FIG. 2, the first crossbar assembly 26 is illustrated. Crossbar assembly 26 includes a first end support 30 and a second end support 32 coupled to opposite end portions of a tubular crossbar component 34. The end supports 30 and 32 are fixedly secured to the crossbar component 34 such that the crossbar assembly 26 forms a sturdy, unitary component suitable for supporting articles thereon.

The first end support 30 includes a housing 36 having an opening 38 defined by a trigger guard 40. Disposed within the opening 38 is a pivotally mounted trigger style actuating lever 42. The actuating lever is supported in a horizontal plane when the crossbar assembly 26 is mounted on the support rails 16 and 18. This provides an especially convenient, ergonomically comfortable component that can easily be engaged with one or more fingers of a hand. Movement of the actuating lever 42 in a horizontal plane further enables shorter individuals, who may have trouble lifting an actuating member in an upward direction, to easily manipulate the actuating lever.

The housing 36 also includes at least one, and more preferably a pair, of support feet 44 that engage within the channel 20 of the first support rail 16 to retain the first end support 30 to the first support rail 16. Optionally, but preferably, each support foot 44 includes at least one rotationally mounted wheel 46 for assisting in providing smooth, linear movement of the first end support 30 along the channel 20.

A first locking pin 48 is operatively coupled to the actuating lever 42 and can be moved between an extended position, as illustrated in FIG. 2, and a retracted position when the actuating lever is manually engaged with one or more fingers of a hand of the user. The first locking pin 48 may engage a selected one of the holes 24 in the first support rail 16 to securely lock the first end support 30 at a desired position along the first support rail.

Referring further to FIG. 2, the second end support 32 is similar in construction to the first end support 30 and also includes a housing 50 having an opening 52 formed by a trigger guard portion 54. The housing 50 may also include one, but more preferably a pair, of support feet 56 that may engage within channel 22 of the second support rail 18, to thus retain the second end support 32 to the second support rail. Preferably, each support foot 56 includes a rotationally mounted wheel 58. Each wheel 58 is mounted via an associated threaded fastener 59 that extends through an associated threaded bore 56a in one of the support feet 56. The wheels 58 enhance linear movement of the second end support 32 along the channel 22 of the second support rail 18. A second locking pin 60 is disposed for sliding movement within the second end support 32 between an extended position (as shown in FIG. 2) and a retracted position. As will be explained further in the following paragraphs, an elongated element, in one embodiment a cable 62, extends through an interior area of the crossbar component 34 and couples the second locking pin 60 with the actuating lever 42. This enables both of the locking pins 48 and 60 to be simultaneously retracted and extended by movement of the actuating lever 42.

Figure 3:
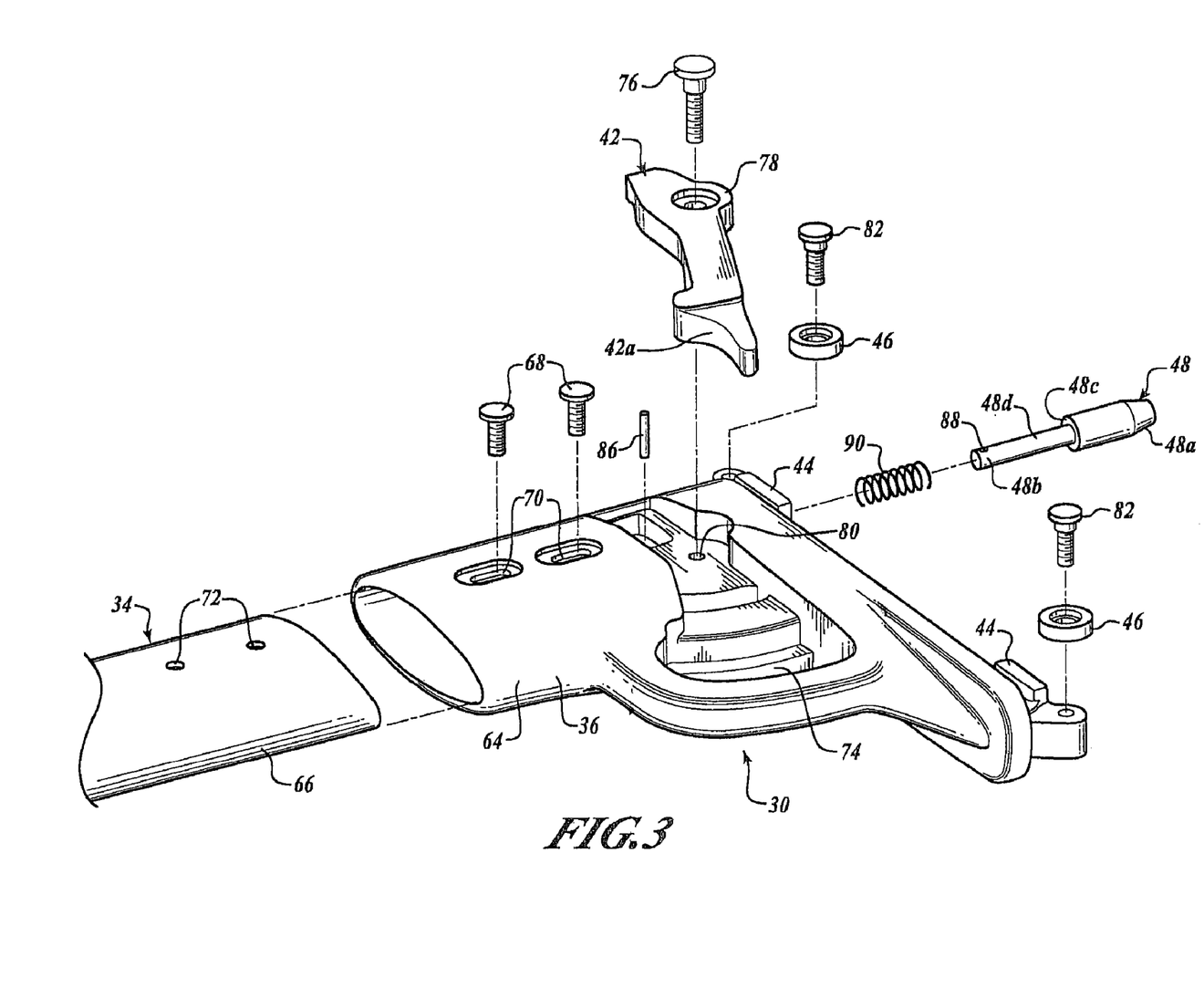
FIG. 3 is an exploded perspective view of the first one of the end supports of the crossbar assembly shown in FIG. 2 from a bottom perspective.

Referring to FIG. 3, the first end support 30 can be seen in greater detail. The housing 36 includes a neck portion 64 which receives an end 66 of the crossbar component 34. A pair of threaded fastening members 68 may be inserted through corresponding openings 70 in the neck portion 64 to engage within holes 72 in the end 66 of the cross bar component 34, to thus secure the end support housing 36 fixedly to the crossbar component 34. The housing 36 also includes a recessed area 74 within which the trigger style actuating lever 42 is disposed. The actuating lever 42 may be secured via a threaded member 76 that extends through a hole 78 in the actuating lever and then into a hole 80 in the housing 36. Wheels 46 may be secured to the support feet 44 by threaded fasteners 82 that extend into engagement with threaded holes 44a adjacent each support foot 44.

Figure 4A:
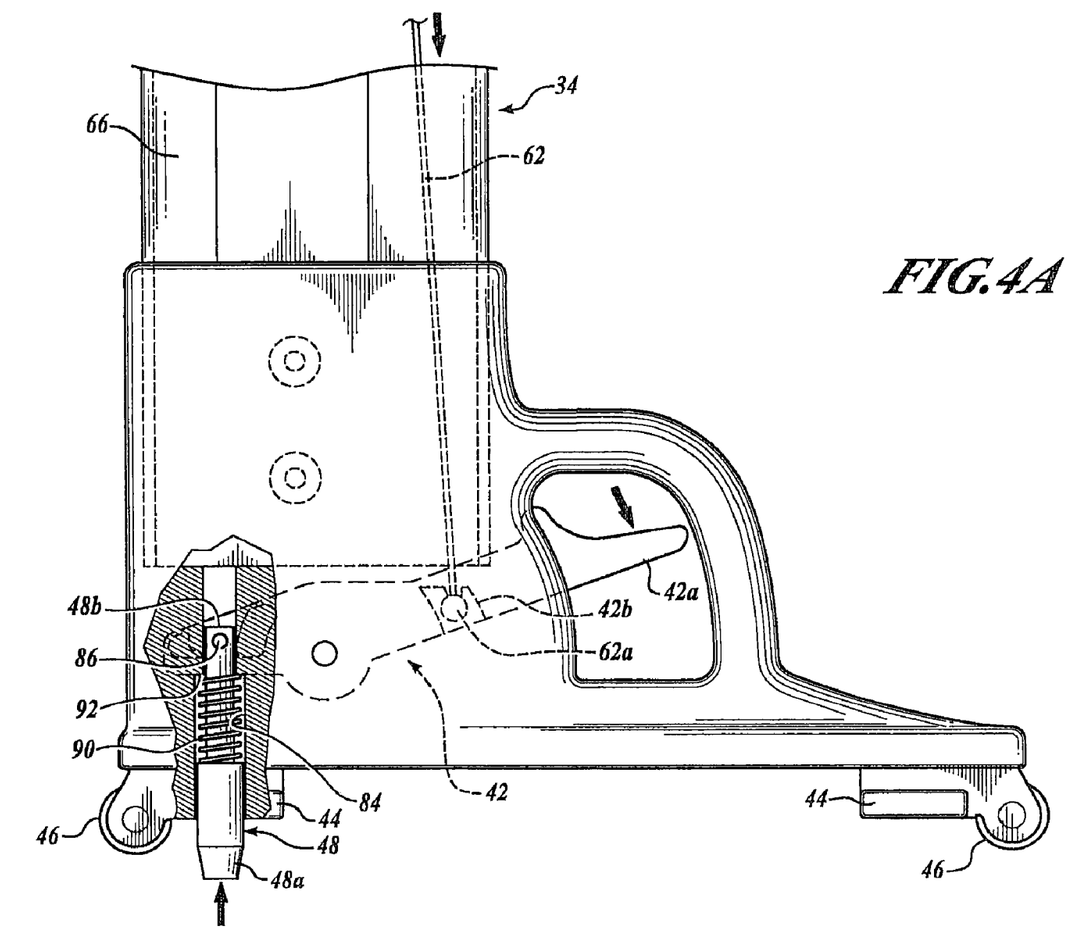
FIG. 4A shows the first end support of FIG. 3 assembled with one end of the cable coupled thereto.
Figure 4B:
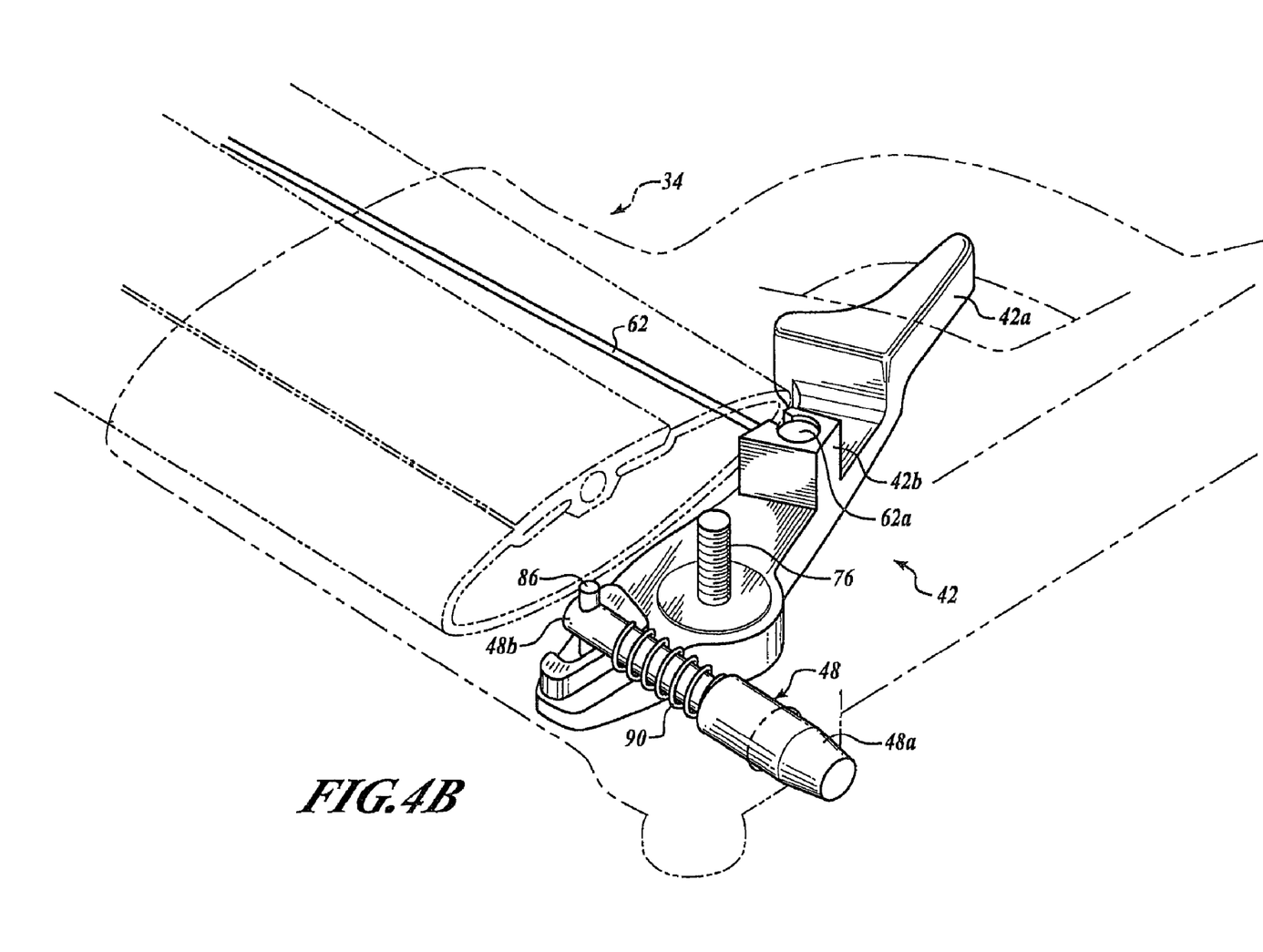
FIG. 4B is a perspective view of a surface of the actuating lever.

With reference to FIGS. 3 and 4A, the first locking pin 48 is disposed within a bore 84 and is able to move linearly within the bore. A head portion 48a of the first locking pin 48 is adapted to engage within one of the holes 24 in the first support rail 16. An opposite end 48b has a hole 88 through which a pin 86 extends to couple the first locking pin 48 to the actuating lever 42. The head portion 48a also has a shoulder 48c, as best seen in FIG. 3, that forms a surface against which a coil spring 90, positioned over a neck portion 48d of the first locking pin 48, may abut. The coil spring 90 is captured within the bore 84 and abuts an interior wall 92 (FIG. 4A) so as to be captured within the bore 84. Thus, the movement of a trigger portion 42a of the actuating lever 42 into an "unlocked" position causes retraction of the first locking pin 48 against the biasing force of the coil spring 90. Once the trigger portion 42a is released, the coil spring 90 biases the first locking pin 48a outwardly into the position shown in FIG. 4. As shown in FIGS. 4A and 4B, the actuating lever 42 also includes a raised portion 42b for capturing a head portion 62a of cable 62.

Figure 5:
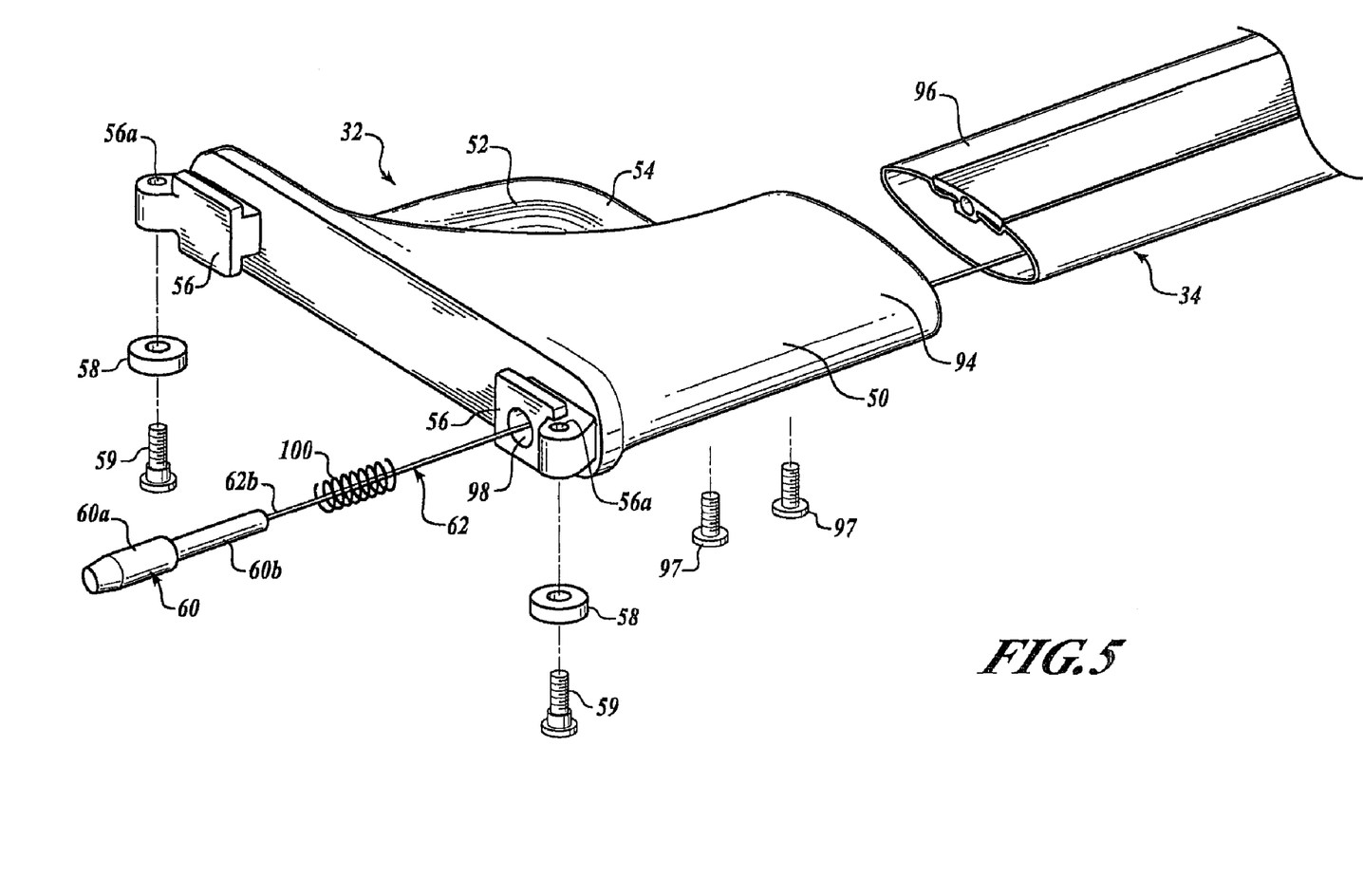
FIG. 5 is an exploded perspective view of a second one of the end supports at the opposite end of the crossbar assembly to that shown in FIG. 3.
Figure 6:
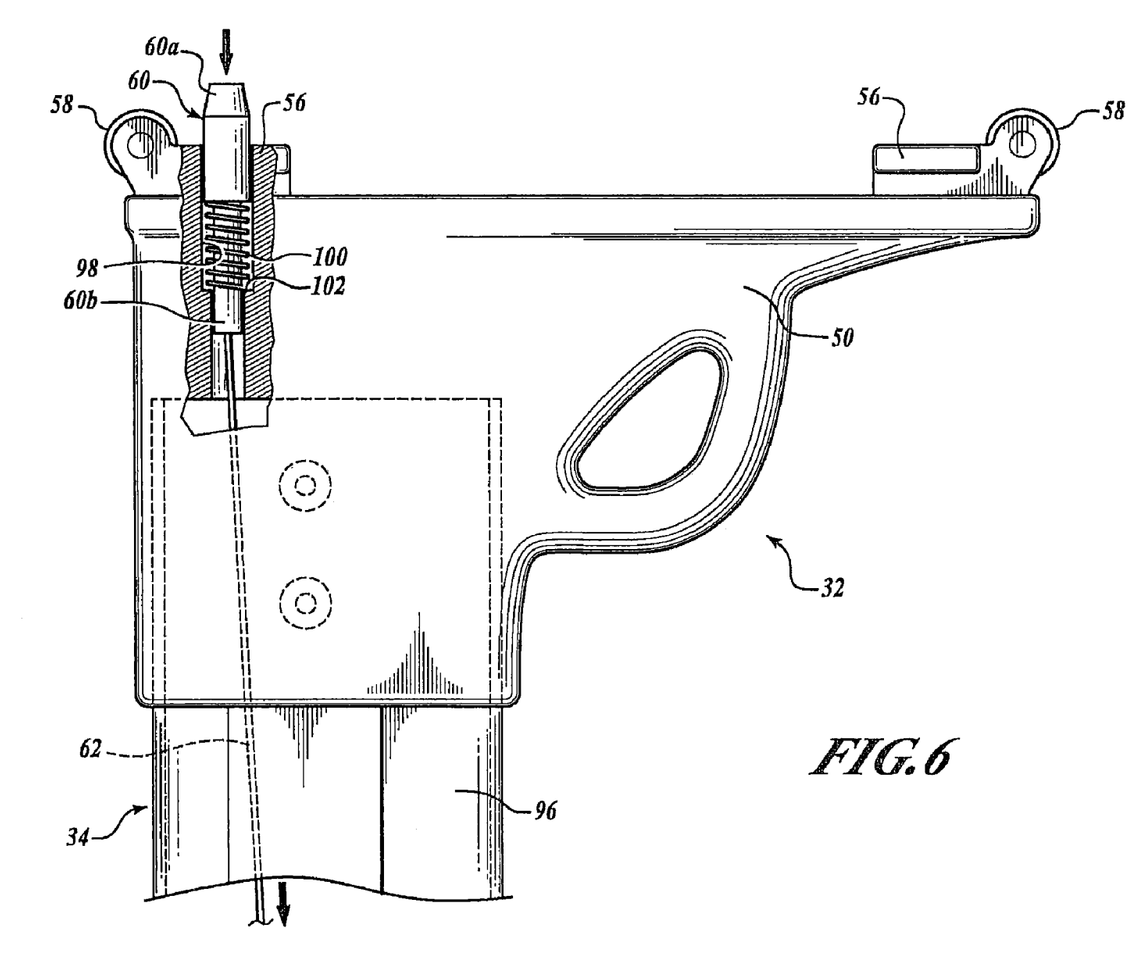
FIG. 6 is a plan view of the end support at FIG. 5 but with a portion broken away illustrating the biasing element used to bias the locking pin held in the second end support.

Referring now to FIG. 5, the second end support 32 is shown in greater detail. The housing 50 includes a neck portion 94 that receives an end 96 of the crossbar component 34. A pair of fastening members 97 may be used in a manner similar to fastening members 68 to secure the end 96 within the neck portion 94 of the housing 50. The housing 50 also includes a bore 98 formed in one of the support feet 56 for receiving the second locking pin 60. The second locking pin 60 also includes a head portion 60a and a neck portion 60b over which a coil spring 100 may be positioned. An end 62b of cable 62 may be secured to the neck portion 60 in any fashion, for example, by being pressed into a grove (not shown) in the neck portion 60b, or by any other suitable means. With brief reference to FIG. 6, the coil spring 100 is captured within the bore 98 and abuts an interior wall portion 102 of the housing 50. In FIG. 6, the second locking pin 60 is shown in its extended position.

Figure 7:
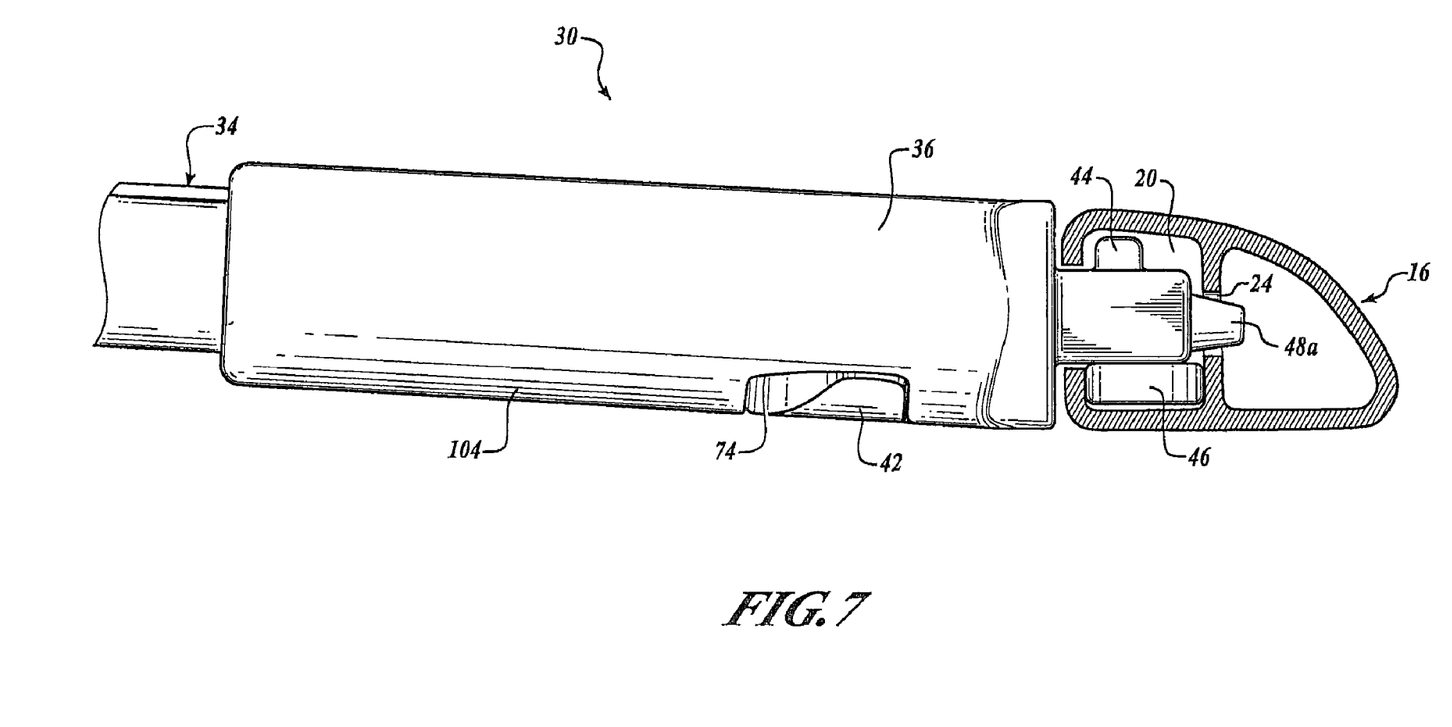
FIG. 7 is an end view of the first end support of the crossbar assembly with its associated support foot supported within its associated support rail.

Referring to FIG. 7, the first end support 30 is shown supported by the first support rail 16. One of the wheels 46 is visible along with one of the foot portions 44 disposed within the channel 20 of the support rail 16. The head portion 48a of the first locking pin 48 is shown engaged in one of the holes 24. The wheels 46 enable smooth, linear movement of the first end support 30 along the length of the support rail 16 and help to prevent binding or "crabbing" of the crossbar assembly 26 as it is adjustably positioned along the support rails 16 and 18. In FIG. 7, it can also be seen that the actuating lever 42, when positioned within the recess 74, is generally flush with a lower surface 104 of the housing 36.

Figure 8:
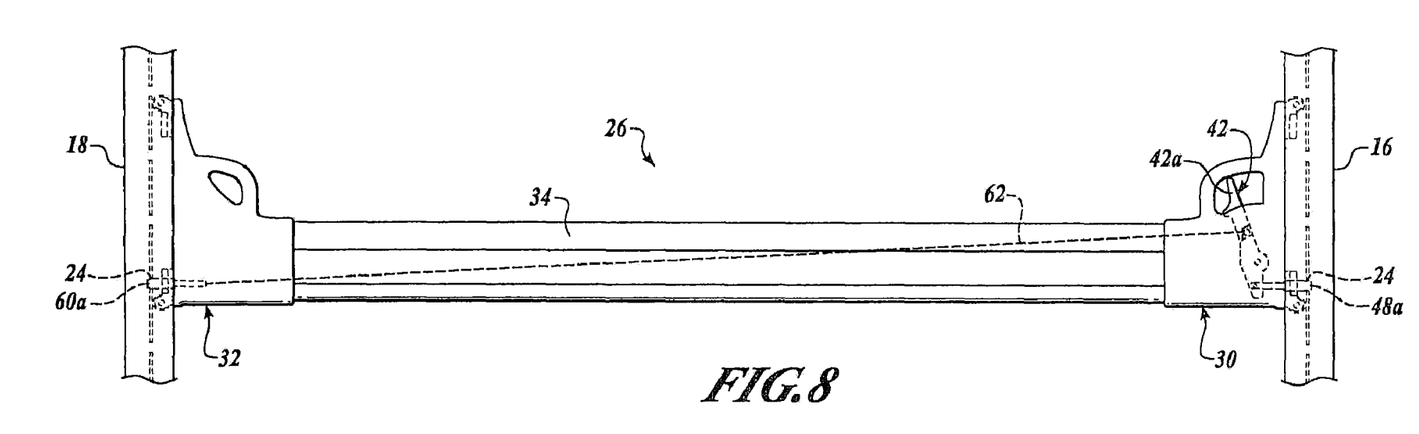
FIG. 8 is a plan view of the crossbar assembly of FIG. 2 positioned on the support rails with the locking pins in locked positions holding the crossbar assembly locked at a desired position.
Figure 9:
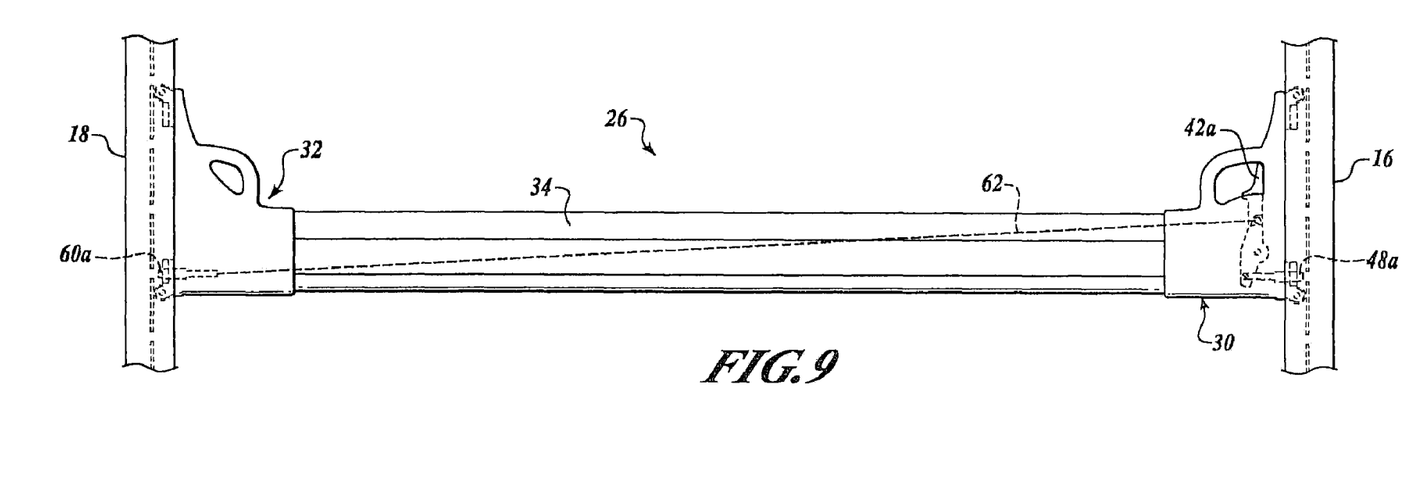
FIG. 9 is a view of the crossbar assembly of FIG. 8 but with the actuating trigger lever engaged to simultaneously retract both of the locking pins, thus enabling adjustable positioning of the crossbar assembly along the support rails.

Referring to FIGS. 8 and 9, to adjust the position of the crossbar assembly 26, the user walks to the side of the vehicle 14 where the first end support 30 is located. The user uses one or more fingers to engage the trigger portion 42a of the actuating lever 42 and to move it into the position shown if FIG. 9. This causes the first and second locking pins 48 and 60 to be retracted from their corresponding holes 24 in the support rails 16 and 18, as shown in FIG. 9. While holding the trigger portion 42a engaged in the orientation shown in FIG. 9, the entire crossbar assembly 26 may be moved along the support rails 16 and 18 and repositioned as needed. When the locking pins 48 and 60 are aligned with a new corresponding pair of holes 24, the user releases the trigger portion 42a of the actuating lever 42. The coil springs 90 and 100 simultaneously bias the locking pins 48 and 60 outwardly into the extended positions shown in FIG. 8. Thus, both of the end supports 30 and 32 are easily simultaneously unlocked, as well as locked, from their respective support rails 16 and 18 from a single side of the vehicle 14. Therefore, the user is not required to first unlock one end support, and then walk to the other side of the vehicle 14 to unlock the other end support, and then to reposition the crossbar assembly, and then separately lock both end supports.

This vehicle article carrier 10 of the present disclosure significantly enhances the ease of adjustably positioning the crossbar assembly without unnecessarily complicating its construction or adding significantly to its cost or weight. The vehicle article carrier 10 can thus permit rapid and easy repositioning of the crossbar component 26 as needed to best position the crossbar assemblies 26 and 28 to suit articles having widely varying shapes and sizes.

What is claimed is:

1. A vehicle article carrier apparatus for supporting articles above an outer body surface of a vehicle, the apparatus comprising:
   first and second support rails secured fixedly to said outer body surface and parallel to one another, each of said support rails including at least one hole formed therein;
   a cross bar assembly having a pair of outer ends, and being supported by said support rails at said outer ends above said outer body surface for supporting articles thereon, said cross bar assembly including:
   a cross bar component having opposite ends;
   first and second end supports coupled to said opposite ends of said cross bar component;
   said first end support including a first locking pin and moveable between extended and retracted positions, relative to said first end support;
   said second end support including a second locking pin moveable between extended and retracted positions relative to said second end support, and when in said extended position being adapted to engage, said hole in said second support rail;
   said first end support including a circumferential opening;
   a trigger shaped actuating lever having a trigger portion, the trigger portion projecting into said circumferential opening and adapted to be engaged with at least one finger, and the actuating lever being pivotally coupled to said first end support and moveable within a horizontal plane relative to said first end support, said locking pin further being pivotally coupled to said actuating lever such that pivotal movement of said actuating lever in a first direction moves said first locking pin linearly into said extended position, wherein said first locking pin engages said hole in said first support rail to secure said first end support stationary relative to said first support rail, and wherein pivotal movement of said actuating lever in a second direction moves said first locking pin linearly into said retracted position to withdraw said first locking pin from said hole in said first support rail, to enable said first end support to be moved relative to said first support rail;
   a flexible, elongated cable for coupling said actuating lever with said second locking pin so that movement of said actuating lever enables both of said locking pins to be moved simultaneously between said retracted and extended positions;
   said first locking pin including a neck portion; and
   a spring disposed on said neck portion for biasing said first locking pin into said extended position, said spring being compressible when said first locking pin is moved into said retracted position by movement of said actuating member in said second direction.

2. The apparatus of claim 1, wherein said cross bar component comprises a tubular component, and wherein said elongated cable extends through an interior area of said cross bar component.

3. The apparatus of claim 1, wherein said first end support has a trigger guard portion, and wherein said trigger shaped actuating lever is disposed within said trigger guard portion.

4. The apparatus of claim 1, wherein:
   each of said first and second support rails includes a channel extending along a substantial portion of a length thereof; and
   each of said end supports includes at least one support foot formed to engage an interior surface of said channel of its respective said support rail to prevent removal of each said end support from its respective said support rail.

5. The apparatus of claim 4, wherein said one support foot of each said end support includes a pair of rotationally mounted wheels adapted to engage said interior surface of its respective channel, to assist in guiding movement of said support feet within said channels.

6. The apparatus of claim 1, further comprising a biasing element disposed within said second end support and operably associated with said second locking pin for biasing said second locking pin towards said extended position.

7. The apparatus of claim 1, wherein said first end support has a recessed portion on a lower surface thereof, said actuating lever is mounted within said recessed portion so as to be generally flush with said lower surface.

8. A vehicle article carrier apparatus for supporting articles above an outer body surface of a vehicle, the apparatus comprising:
 first and second support rails secured fixedly to said outer body surface and parallel to one another each of said support rails, each of said support rails including at least one hole formed therein;
 a cross bar assembly having a pair of outer ends, and being supported by said support rails at said outer ends above said outer body surface, said cross bar assembly including:
 a tubular cross bar component having opposite ends;
 first and second end supports coupled to said opposite ends of said cross bar component;
 said first end support including a first locking pin having a neck portion, said first locking pin being moveable between extended and retracted positions relative to said first end support;
 said second end support including a second locking pin moveable between extended and retracted positions relative to said second end support, and when said second locking pin is in said extended position second locking pin engages said hole in said second support rail;
 said first end support having a circumferential shaped opening;
 a trigger shaped actuating lever having a trigger portion extending into said circumferential opening, and adapted to be engaged with at least one finger, and said actuating lever being pivotally moveable within a horizontal plane, said first locking pin being pivotally coupled to said actuating lever such that pivotal movement of said actuating lever moves said first locking pin in a first direction into said extended position, wherein said first locking pin engages said hole in said first support rail to secure said first end support stationary relative to said first support rail, and said actuating lever being adapted to move said first locking pin in a second direction into said retracted position to withdraw said first locking pin from said hole in said first support rail to enable said first end support to be moved relative to said first support rail;
 a cable extending within an interior area of said cross bar component for coupling said actuating lever with said second locking pin so that movement of said actuating lever enables both of said locking pins to be moved simultaneously between said retracted and extended positions;
 a biasing spring disposed over the neck portion of the first locking pin for biasing the first locking pin into the extended position, the biasing spring being linearly compressible when the actuating member is rotated to move the first locking pin in the second direction.

9. The apparatus of claim 8, wherein said first end support has a trigger guard portion, and wherein said trigger shaped actuating lever is disposed within said trigger guard portion.

10. The apparatus of claim 8, wherein:
 each of said first and second support rails includes a channel extending along a substantial portion of a length thereof; and
 each of said end supports includes at least one support foot formed to engage an interior surface of said channel of its respective said support rail to prevent removal of each said end support from its respective said support rail.

11. The apparatus of claim 10, wherein said one support foot of each said end support includes a pair of rotationally mounted wheels adapted to engage said interior surface of its respective channel, to assist in guiding movement of said support feet within said channels.

12. The apparatus of claim 8, further comprising an additional biasing element disposed within said second end support and operably associated with said second locking pin for biasing said second locking pin towards said extended position.

13. The apparatus of claim 8, wherein said first end support has a recessed portion on a lower surface thereof, said actuating lever is mounted within said recessed portion so as to be generally flush with said lower surface.

14. A vehicle article carrier apparatus for supporting articles above an outer body surface of a vehicle, the apparatus comprising:
 first and second support rails secured fixedly to said outer body surface and parallel to one another each of said support rails, each of said support rails including at least one hole formed therein;
 a cross bar assembly having a pair of outer ends, and being supported by said support rails at said outer ends above said outer body surface for supporting articles thereon, said cross bar assembly including:
 a cross bar component having opposite ends;
 first and second end supports coupled to said opposite ends of said cross bar component;
 said first end support including a first locking pin and moveable between extended and retracted positions, relative to said first end support;
 said second end support including a second locking pin moveable between extended and retracted positions relative to said second end support, and when in said extended position being adapted to engage said hole in said second support rail;
 said first end support including a circumferential shaped opening forming a trigger guard portion;
 a trigger shaped actuating lever having a trigqer portion extending from within said first end support to project into said circumferential shaped opening, and adapted to be engaged with at least one finger, said first locking pin being pivotally coupled to said actuating lever;
 said actuating lever being pivotally moveable within a plane parallel to said outer body surface, said actuating lever adapted to move said first locking pin in a first direction linearly into said extended position, wherein said first locking pin engages said hole in said first support rail to secure said first end support stationary relative to said first support rail, and said actuating lever being adapted to move said first locking pin linearly in a second direction into said retracted position to withdraw said first locking pin from said hole in said first support rail to enable said first end support to be moved said first support rail;

a flexible, elongated cable for coupling said actuating lever with said second locking pin so that movement of said actuating lever enables both of said locking pins to be moved simultaneously between said retracted and extended positions; and a first coil spring disposed over said neck portion of said first locking pin, and housed in said first end support, for biasing said first locking pin into said extended position, and said first coil spring being compressible on said neck portion when said actuating lever is moved pivotally to cause said first locking pin to be moved in said second direction; and a biasing element operably associated with said second locking pin and coupled to said elongated cable, for biasing said second locking pin into locking engagement with said second support rail when said actuating lever is moved in said second direction.

15. The apparatus of claim 14, wherein:

each of said first and second support rails includes a channel extending along a substantial portion of a length thereof; and each of said end supports includes at least one support foot formed to engage an interior surface of said channel of its respective said support rail to prevent removal of each said end support from its respective said support rail.

16. The apparatus of claim 15, wherein said one support foot of each said end support includes a pair of rotationally mounted wheels adapted to engage said interior surface of its respective channel, to assist in guiding movement of said support feet within said channels.

17. The apparatus of claim 14, wherein said coil spring and said biasing element cooperatively operate to simultaneously bias said locking pins in their extended positions and to bias said actuating lever into said an extending position.

* * * * *